(12) United States Patent
Zellweger

(10) Patent No.: US 6,301,583 B1
(45) Date of Patent: Oct. 9, 2001

(54) METHOD AND APPARATUS FOR GENERATING DATA FILES FOR AN APPLET-BASED CONTENT MENU USING AN OPEN HIERARCHICAL DATA STRUCTURE

(75) Inventor: Paul Zellweger, 12 Holworthy Pl., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/080,102

(22) Filed: May 16, 1998

Related U.S. Application Data

(60) Provisional application No. 60/046,919, filed on May 16, 1997.

(51) Int. Cl.⁷ .................................................. G06F 17/30
(52) U.S. Cl. .......................... 707/103; 707/102; 707/104; 707/100
(58) Field of Search ................................. 707/4, 103, 100, 707/101, 102, 104; 709/203; 345/348; 395/200.48

(56) References Cited

U.S. PATENT DOCUMENTS

| | | | |
|---|---|---|---|
| 5,630,125 | * 5/1997 | Zellweger | 707/103 |
| 5,732,218 | 3/1998 | Bland et al. | 709/224 |
| 5,742,768 | 4/1998 | Gennard et al. | 395/200.33 C |
| 5,920,696 | * 7/1999 | Brandt et al. | 395/200.48 |
| 5,923,885 | * 7/1999 | Johnson et al. | 395/712 |
| 5,959,630 | * 9/1999 | Takeuchi et al. | 345/348 |
| 5,987,454 | * 11/1999 | Hobbs | 707/4 |
| 6,006,252 | * 12/1999 | Wolfe | 709/203 |
| 6,070,167 | * 5/2000 | Qian et al. | 707/102 |

OTHER PUBLICATIONS

U.S. application No. 60/046,920, Zellweger, filed May 16, 1997.

* cited by examiner

*Primary Examiner*—Thomas G. Black
*Assistant Examiner*—Charles L. Rones

(57) ABSTRACT

An authoring system is disclosed that uses an open hierarchical data structure to build and maintain menu data for an applet running on a client computer that displays a series of nested, pop-up list menus. These menus constitute a content menu that serves as an end-user access method to Web pages on a Web site. The authoring system uses the open hierarchical data structure to organize information on the Web site and generate the menu data for a content menu. The authoring system allows developers to select when menu data files are generated, at runtime or compiled, and their optimal file size. This enables the Web developer to generate menu files that can be optimized for use in a client-server network.

18 Claims, 16 Drawing Sheets

76

76

Applet Menu Data Configuration Window

Developer: _____

Applet File: _____

Application Name: _____

Directory: _____

File Generation: ○ Runtime Menu Data
○ Compiled Menu Data

Optimal File Size: ____ k

File Use: ○ Track End-User Naviagtion (Done)  (Cancel)

Fig. 7

METHOD AND APPARATUS FOR GENERATING DATA FILES FOR AN APPLET-BASED CONTENT MENU USING AN OPEN HIERARCHICAL DATA STRUCTURE

CROSS REFERENCE TO RELATED APPLICATION

This application is based on Provisional Application No. 60/046,919 entitled "Method and Apparatus for Generating Applet Data Using An Open Hierarchical Data Structure", filed May 16, 1997.

| | | |
|---|---|---|
| 6,006,252 | 12/21/99 | Wolfe |
| 5,987,454 | 11/16/99 | Hobbs |
| 5,959,630 | 9/28/99 | Takeuchi et. a. |
| 5,923,885 | 7/13/99 | Johnson et. al. |
| 5,920,696 | 7/6/99 | Brandt et. al. |
| 5,742,768 | 4/21/98 | Gennaro et. al. |
| 5,732,218 | 3/24/98 | Bland and Nepustil |
| 60/046,920 | 5/16/97 | Zellweger |
| 5,630,125 | 5/13/97 | Zellweger |

FIELD OF INVENTION

The present invention relates to computer software used to organize information on a Web site, and in particular, it relates to an end-user access method, identified as a content menu, that is displayed by an applet running on a client computer using menu data generated by an authoring system using an open hierarchical data structure.

BACKGROUND

End-users always have a hard time finding information on a Web site because prior access methods cannot handle the quantity of information or the level of detail. The basis for this problem lies in the underlying technology used to organize or find information. The search engine, the most popular method, matches user supplied words against text in server files or keywords in a database system. However, problems with word matching techniques are well known and include the retrieval of numerous irrelevant "hits" or, worse yet, the missing retrieval of important references simply because the wrong search word was supplied.

To improve end-user access on a Web site, other access methods are used in conjunction with a search engine. These include tables of contents, and more ambitious structures like directory assistance or catalog systems. Unfortunately, each technology has its own set of limitations. For instance, a table of contents only provides a broad overview of a Web site with no specifics, and directory assistance and catalog systems provide detail but they become very difficult to maintain with cross referencing.

The present invention overcomes this end-user access problem on a Web site by referring to methods disclosed by Zellweger (5,530,125 May 13, 1997) to build and manage a content menu. The distinctive advantage of this approach is that the underlying menu structure is designed to handle details and cross references. The menu it produces works like an index in the back of a book where information is ordered by a series of embedded lists. End-users navigate these nested list menus to reach information at the end of a menu path. On a computer these lists go well beyond the physical constraints of a list on a page. There is no limit to the number of items in a content menu lists, and with the open hierarchical data structure, the computer takes care of all the cross references and details.

Zellweger teaches how an interactive authoring system can be used to manage menu data and generate menu data for a content menu on a stand-alone computer. The disclosure also addresses alternative settings such as a client server network but this prior art does not teach how to configure menu data files for an applet running in a client-server setting. The prior art taught how to fetch menu data from a fast storage device. Each time an item was selected from a menu list, new menu list data was retrieved from a storage device on the desktop computer like a hard drive. In a client server network setting, where such traffic can impact a server, this particular program logic is highly inefficient.

More recently, Zellweger (60/046,920) disclosed the way to generate linked hypertext list menus to produce a content menu on a Web site. However, when using hypertext code, list menus look primitive and when they are programmed to track end-user selections limitations inherent in HTML only allow one list menu per file, creating performance bottlenecks by requiring more network traffic than necessary. In order to overcome these technical flaws, the present invention discloses the means to build and maintain a content menu using an applet-based system.

Developers use programming languages like Sun Microsystem's Java to build an applet that runs on a client computer. Applets have distinct advantages over an HTML-based user interface because it has a more windows-like appearance, and an applet running on a client machine has the fill power of a programming language, including the ability to employ local variables and open and close files on a server.

OBJECTS AND ADVANTAGES

It is a general object of the present invention to provide a method and apparatus for a menu authoring system means to maintain and generate menu data used by an applet running on a client computer that displays pop-up list menus that constitute a content menu on a Web site.

One object of the present invention is to provide the software means for building and maintaining applet menu data using an open hierarchical data structure that enables multiple paths to the same information object at the end of a path.

Another object of the present invention is to provide the means to specify the size of a menu data file so the authoring system can generate one or more nested lists to the same file, instead of prior methods that fetched one list at a time, and thereby reduce overall network traffic.

One object of the present invention is to enable Web site developers to select how and when menu data files are generated, in order to enhance content menu performance.

Another object of the present invention is to enable Web site developers to select how and when menu data files are generated in order to use dynamic menu values.

One object of the present invention is to provide the means to enable end-users to navigate through a succession of pop-up list menus to identify detailed information on a Web site, and thereby avoid unnecessary trial and error navigation.

Another object of the present invention is to provide the software means to shift the interactive activity of a client server network from the server to the client.

One object of the present invention is to provide the software means to improve the response of a content menu by loading more menu data on the client platform.

One object of the present invention is to provide the software means to enable information providers to track end-user navigation of a content menu.

SUMMARY OF THE INVENTION

The objects of the present invention are attained by providing the methods and apparatus of a menu authoring system that generates menu data files configured for an applet running on a client computer in a client-server network like the World Wide Web, The applet generates one or more nested pop-up list menus that link to content on a Web page. The menu authoring system uses an open hierarchical data structure to build and maintain the menu data for these menus. Web-site developers use the interactive authoring system to create menu paths to individual pages, and end-users navigate these paths to locate relevant information. The authoring system, in the present invention, enables developers to specify when these menu data files are generated and the optimal file size in order to minimize computing demands on the server, reduce network traffic, and improve response time for the end-user on a client computer.

BRIEF DESCRIPTION OF THE FIGURES

FIG. 7 depicts the applet data configuration window in the authoring system of the present invention.

DETAILED DESCRIPTION OF THE FIGURES

Figure 1:
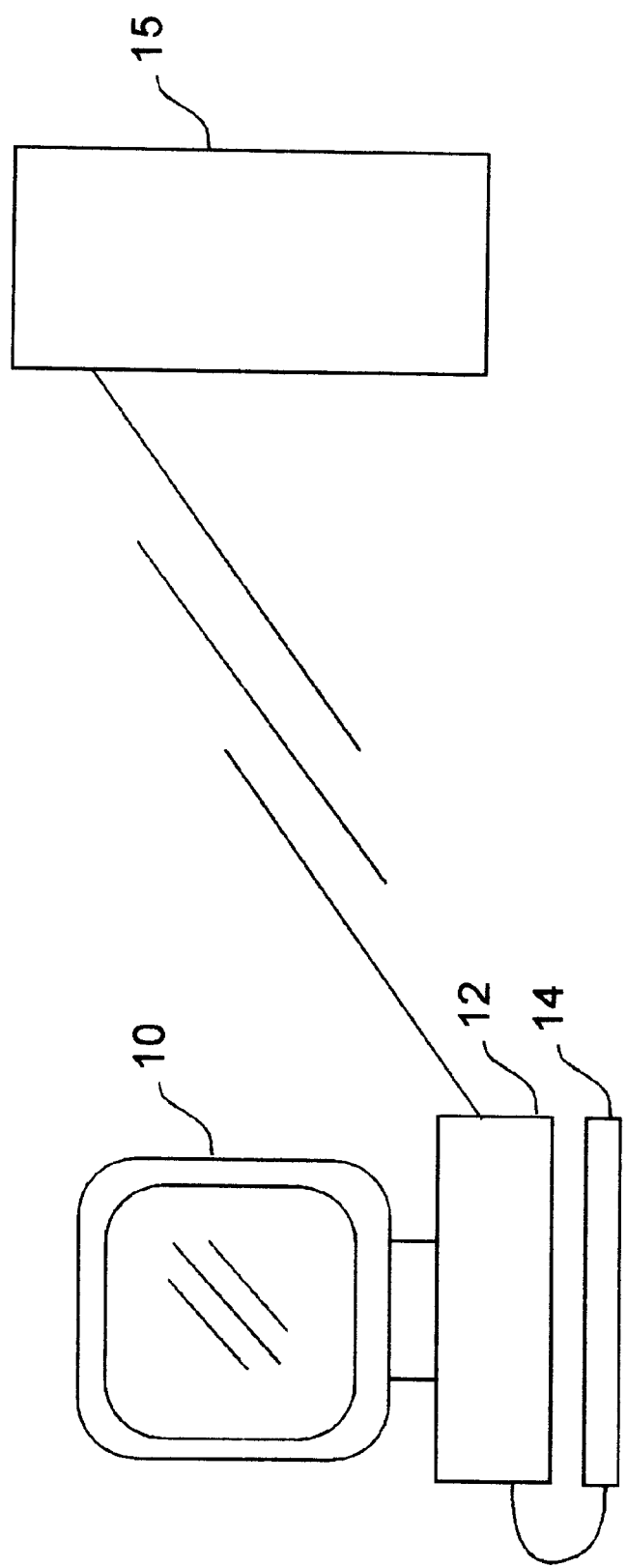
FIG. 1 depicts the client server apparatus of the present invention.

The client server apparatus of the present invention is depicted in FIG. 1. The server computer 15 contains an operating system, a database management system, and communications software, as well as the menu data generated by the present invention. The client computer 12 has its own operating system and communication software, and is linked electronically to the server computer 15. The client computer 12 includes end-user devices like a keyboard 14 and a display monitor 10. A commercially available browser, like Netscape, is installed on the client computer 12 and requests hypertext files stored on server computer 15 to generate a user interface on the display monitor 10. The server computer 15 downloads the hypertext file over communication lines to the browser.

The browser software on the client computer 12 is also responsible for running the byte code associated with an applet in a hypertext file. In addition, the browser software is responsible also for handling server file i/o made by the applet during execution time.

Figure 2:
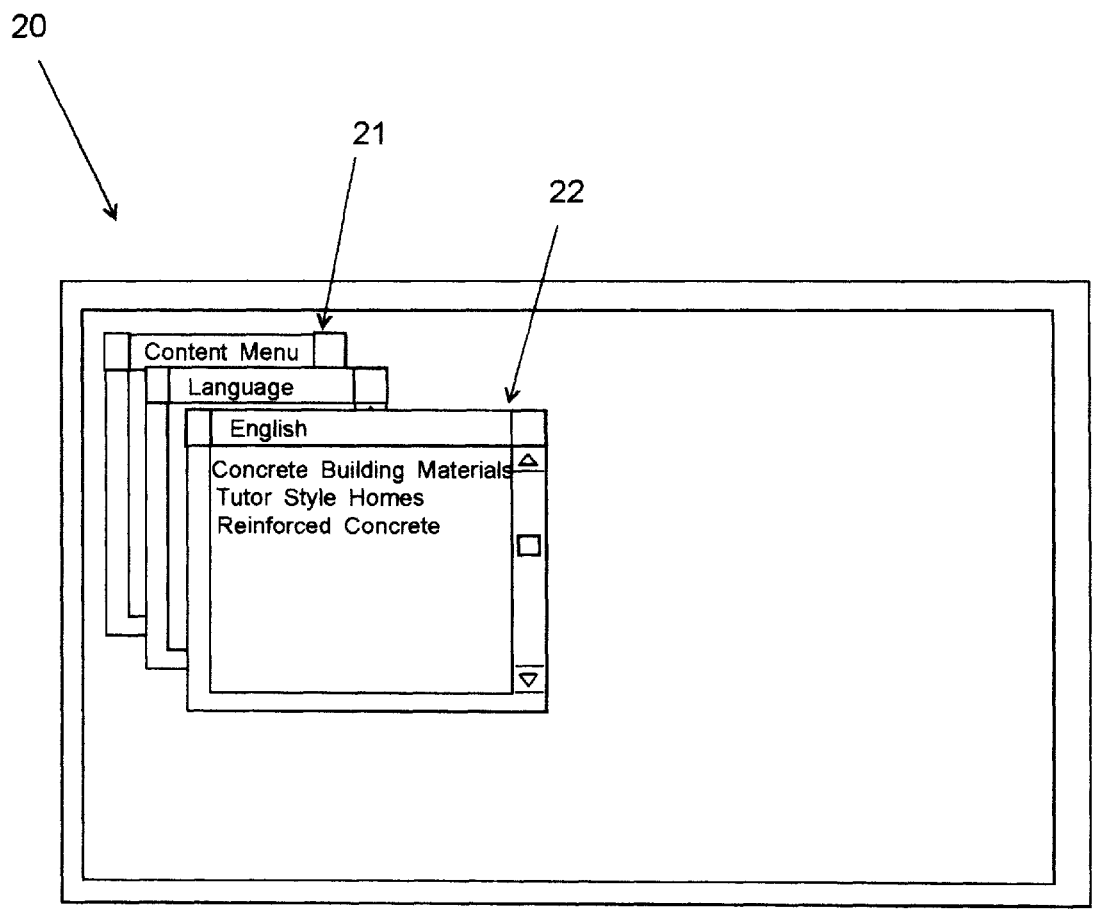
FIG. 2 depicts a graphic presentation of the content menu user interface running on a client computer.

FIG. 2 depicts a graphic represent of a content menu user interface 20 on the monitor apparatus 10 of client computer 12. End-users navigate through a succession of nested pop-up list menus to reach information on a Web page. Each time an item is selected from a menu list, like 22, the applet either generates another pop-up list menu, or it links to a Web-page associated with the menu path. Each list menu includes a title and, when appropriate, a scrolling bar. The list title corresponds to the item selected in the most recent list menu. The nested list menus cascade across window 20 in a left to right, downward progression. In order to move back up this progression, the end-user simply selects a non-current list menu, like 21, to close more recent menus.

Figure 3:
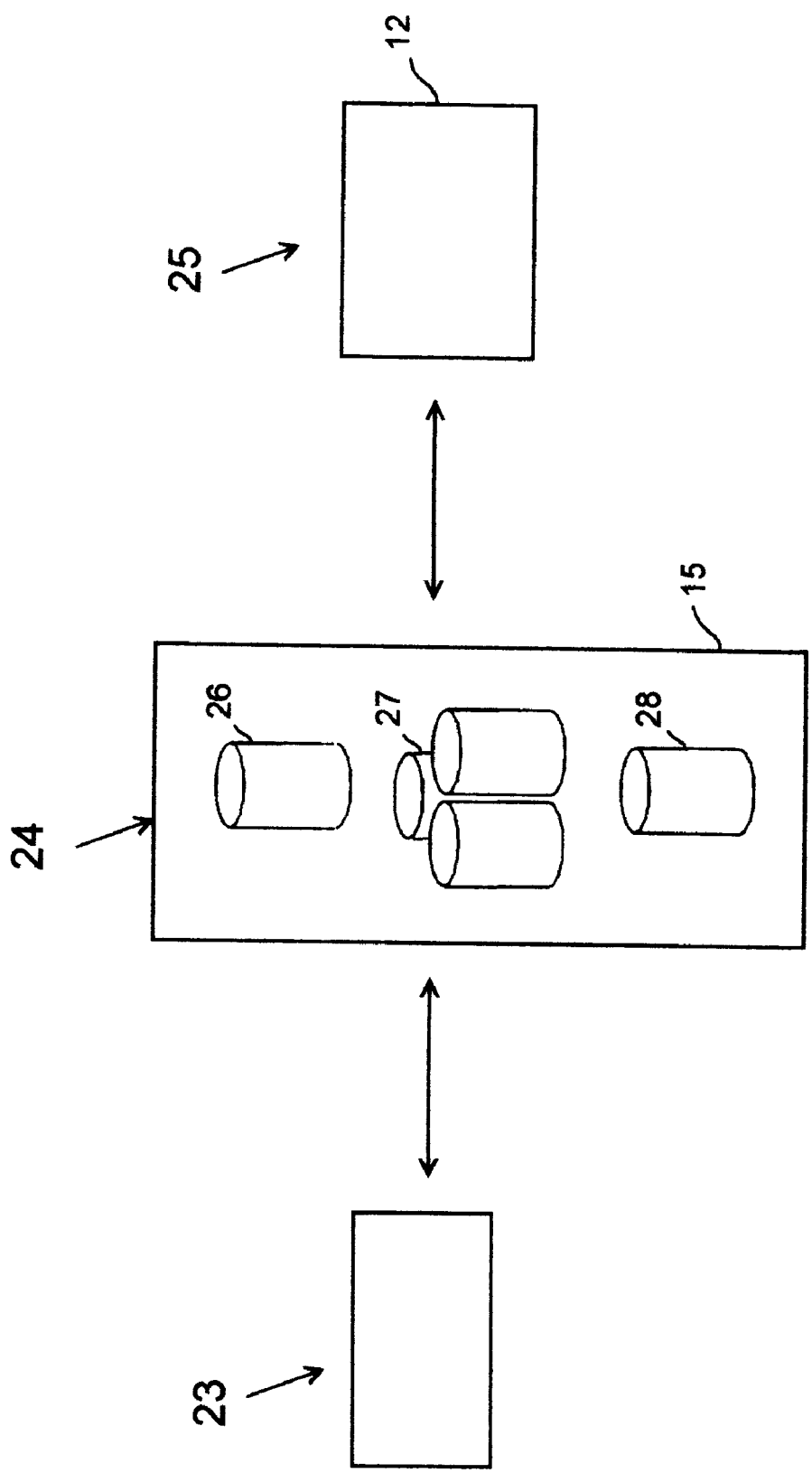
FIG. 3 depict an overview of the main components of the present invention.

FIG. 3 depicts the three major components of the present invention. This includes an authoring system 23, the server files 24 associated with the menu system, and a commercially available browser 25. The authoring system 23 includes the interactive software tools and utilities used to build and maintain menu data using an open hierarchical data structure. The authoring system 23, in the present invention, allows the developer to select when the applet menu data files are generated, at runtime when client browser software requests it, or as a part of a general distribution release.

In a general distribution release, the authoring system 23 generates or compiles one or more menu data files that represent all possible lists in the open hierarchical data structure. The complete set of data files are stored on the server computer 15 and represent static menu values that do not change over time from one general release to the next. The alternative, runtime files, represent the most current values in the structure but generating them at on demand can divert server performance by competing for limited resources.

The server menu files 24 include the applet byte code file 26, menu data files 27, and a script file 28. The applet byte code file 26 is responsible for generating content menu user interface 20. This code is downloaded to the client computer 12 and executed by the browser software 25 to display the succession of pop-up list menus that constitute the content menu. The menu data files 27 include either runtime or compiled files, depending upon the configuration selected by the developer. Script file 28 on server 15 is responsible for providing runtime capabilities in content menu 20 by communicating directly with the applet byte code file 26 running on client computer 12.

Figure 4:
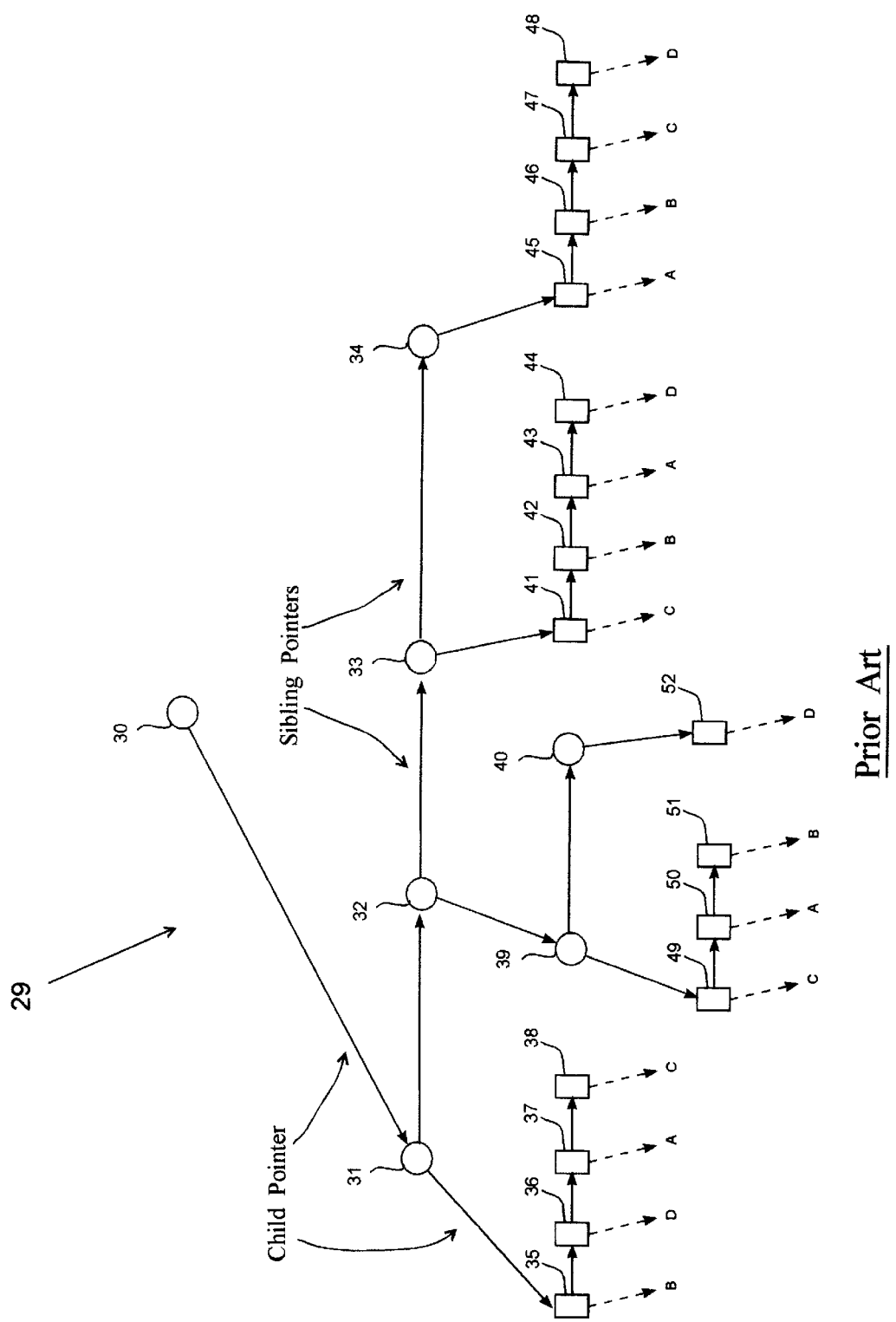
FIG. 4 (prior art) depicts the open hierarchical data structure employed to store and retrieve menu data used by applets to implement a content menu.

The present invention uses a prior art, the open hierarchical data structure, to build and manage the menu data files used by the applet byte code file 26 in the present invention to display the content menu. This structure, depicted in FIG. 4 as 29, enables one or more paths to the same Web page object, and thereby represents multiple ways of looking up the same piece of information.

Generational terms, such as parent and child, are used to describe how structural elements relate to one another. For example, in the flow from the root node to a leaf node, a parent node represents a predecessor, and a child node represents a successor. In structure 29, a parent node can only have one child, but a child can have more than one parent. Each node in structure 29 corresponds to an item in a list menu. Arcs or pointers show how each item relates to another. Sibling pointers connect an item to a list, and child pointers link an item in one list to another or to a Web page at the end of a path.

Figure 5:
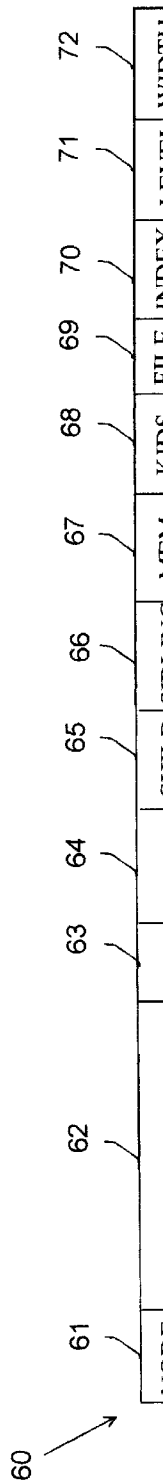
FIG. 5 depicts the database structure used to represent nodes in the open hierarchical data structure.

The preferred embodiment of the present invention represents nodes in structure 29 by a database structure 60 depicted in FIG. 5. Each row element in structure 60 represents information associated with the node in structure 29. This includes a unique id number in field column 61, a topic representing a list item in 62, a code used to track end-user's navigation in 63, and the number of child nodes in the next list in 68. Mem 67 stores the amount of file memory required for the current node's successor list. Each list is ordered by the sibling 66, and child 65 stores the node id of the first item in a successor list. Parent 64 stores the node id of the primary parent of the current list; all other parent nodes in structure 29 are considered step-parents.

Figure 6:
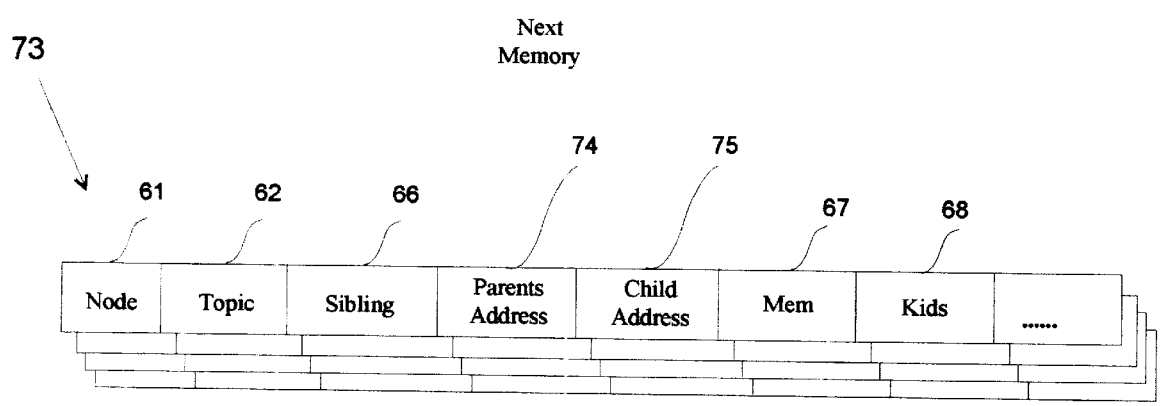
FIG. 6 depicts the record structure of an alternative storage means for the open hierarchical data structure.

Alternative embodiments of the present invention store structure 29 in a predetermined file format that orders node records by lists and their respective generations. FIG. 6 depicts record 73 of this alternative storage means. Some field values, like node 61, topic 62, sibling 66, mem 67, and kids 68, directly correspond to the values in structure 60. In addition, record 73 also includes fields that store address information on the file location of the parent record 73 in 74 and the successor list record in field 75. These address fields make this alternative storage a highly efficient retrieval technology compared to the i/o overhead associated with a database system.

The Applet menu data configuration window 76, depicted graphically in FIG. 7, enables developers to configure the application, and supply information about it. This includes the application name and directory, and when the menu data files are generated, at runtime or compiled as part of a general release. The window 76 also enables the menu developer to specify the optimal file size, and indicate if end-user tags are included in menu data files.

Figure 8:
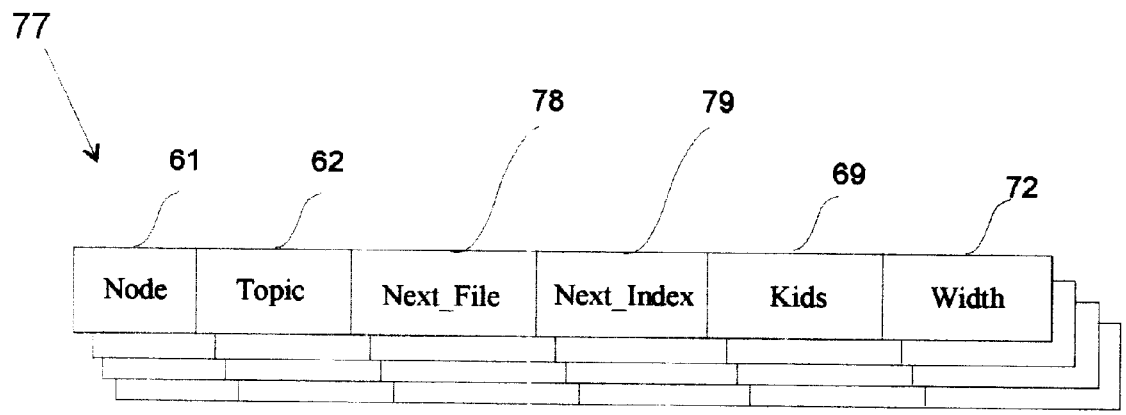
FIG. 8 depicts the record structure of the menu data file.

A record 77 in the menu data file 27 is depicted in FIG. 8. Each record 77 represents a node in structure 29, and each file 27 represents a set of related nodes, representing a parent and its successive generations. Each record 77 includes a field that stores a node id in 61, a topic string in 62 used for a list item, the number of child nodes in 69, and the maximum width of a child topic in 72.

The next_file field 78 and next_index 79 represent the file location for the next object, a menu data record that represents a successive list or a Web page URL. Values in next_index 79 also indicate how the next successive file 27 is generated. When next_index 79 contains a NULL value the next object represents a runtime file, otherwise the value represents a record 77 location. That is, unless kids 69 is zero, and the next object is Web page and next_file 78 stores its file name.

Figure 9A:
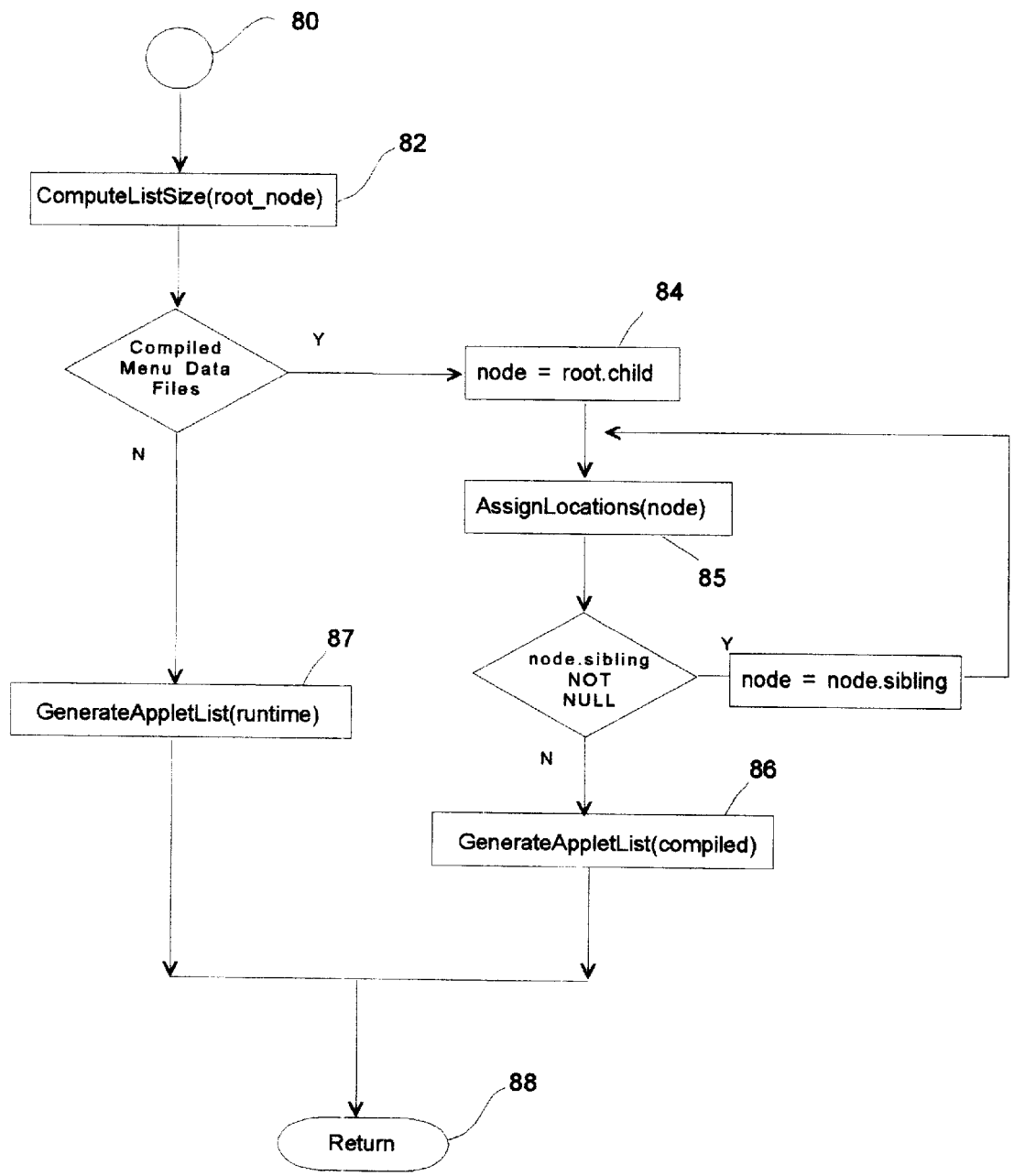
FIGS. 9a through 9e depict flow charts of the program logic in the present invention used to generate menu data files.

FIGS. 9a through 9e depict the flow charts associated with the program logic used to generate a menu data file 27 processed by applet file 26 on the client computer 12. The main program driver is depicted in FIG. 9a. On selecting the Done button on configuration window 76, program control flows to 80. The main program driver first calls ComputeListSize routine 90 at 82 to calculate the memory requirements for each list in structure 29 and store it in each respective parent node. Alternative embodiments of the present invention maintain the size of each list dynamically whenever a list item is added or removed from the structure.

If Compiled Menu Data is selected by the developer on the configuration window 76, program flows to 84 and AssignLocations routine 100 is called for each child node of the root. The AssignLocations routine 100 sets file 69 and index 70 in structure 60 according to the optimal file size supplied by the developer. Next, routine 80 calls GenerateAppletList routine 110, passing a compiled flag parameter to generate source code in the applet for the top list menu, and compile menu data files for all remaining lists in structure 29. If the developer selected Runtime files, GenerateAppletList routine 110 with a runtime parameter, generates source code for applet file 26 that constructs the top list menu in the content menu. Each item in this list refers to a menu data file 27. At 88, routine 80 returns control to the calling routine.

Figure 9B:
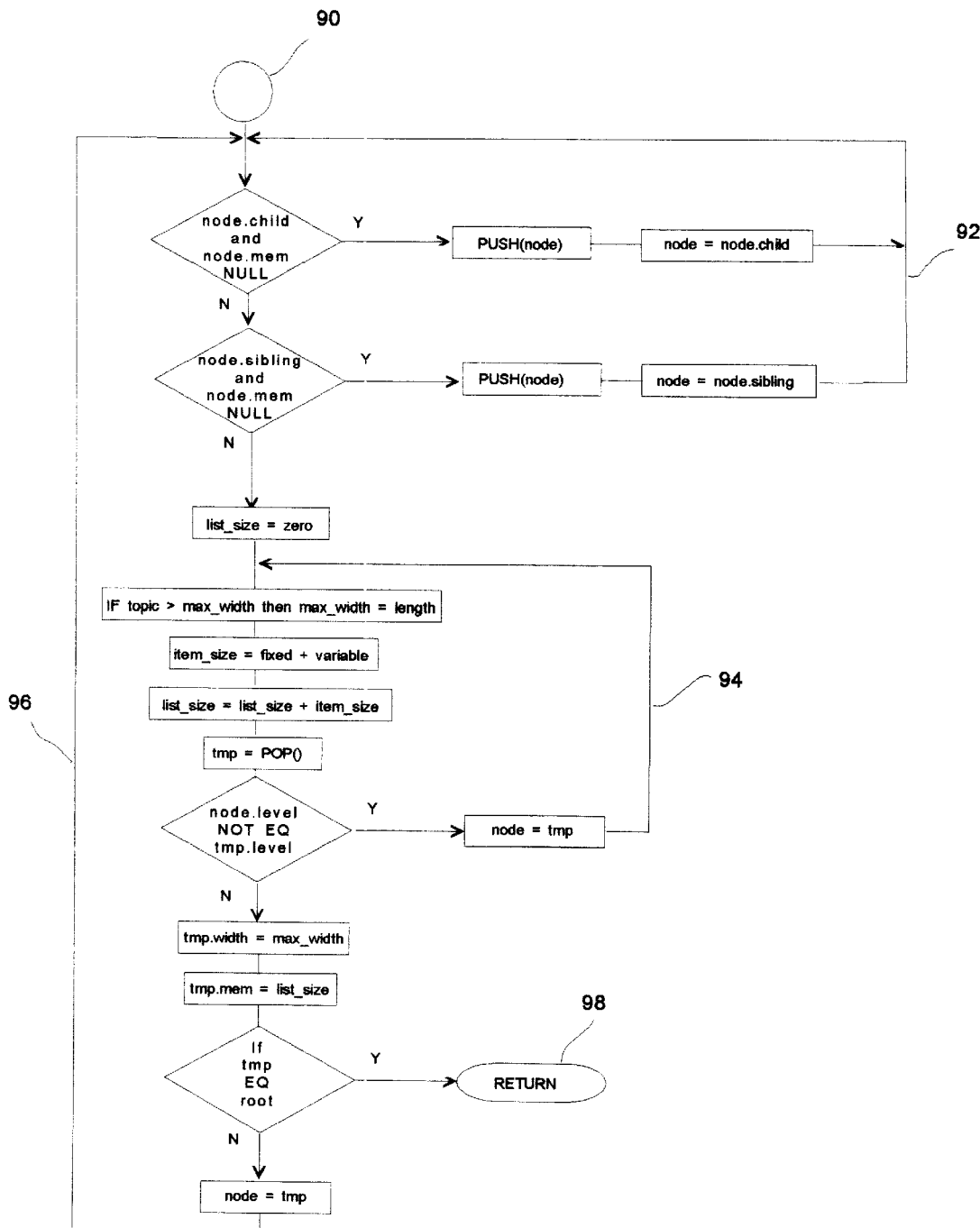

The flow chart of the program logic for ComputeListSize routine 90 is depicted in FIG. 9b. Routine 90 uses a FILO (first in, last out) stack to visit each node in structure 29. In loop 92, routine 90 travels down the structure and across sibling lists pushing each node 61 on the stack. When routine 90 reaches a node at the end of a path, it pops the stack to visit each node in a sibling list and compute its memory requirements. When a parent node is reached, list_size is assigned to mem 67. If the parent node is a root then control returns to the calling routine at 98, otherwise program control flows through loop 96 to visit the remaining nodes on the stack.

Figure 9C:
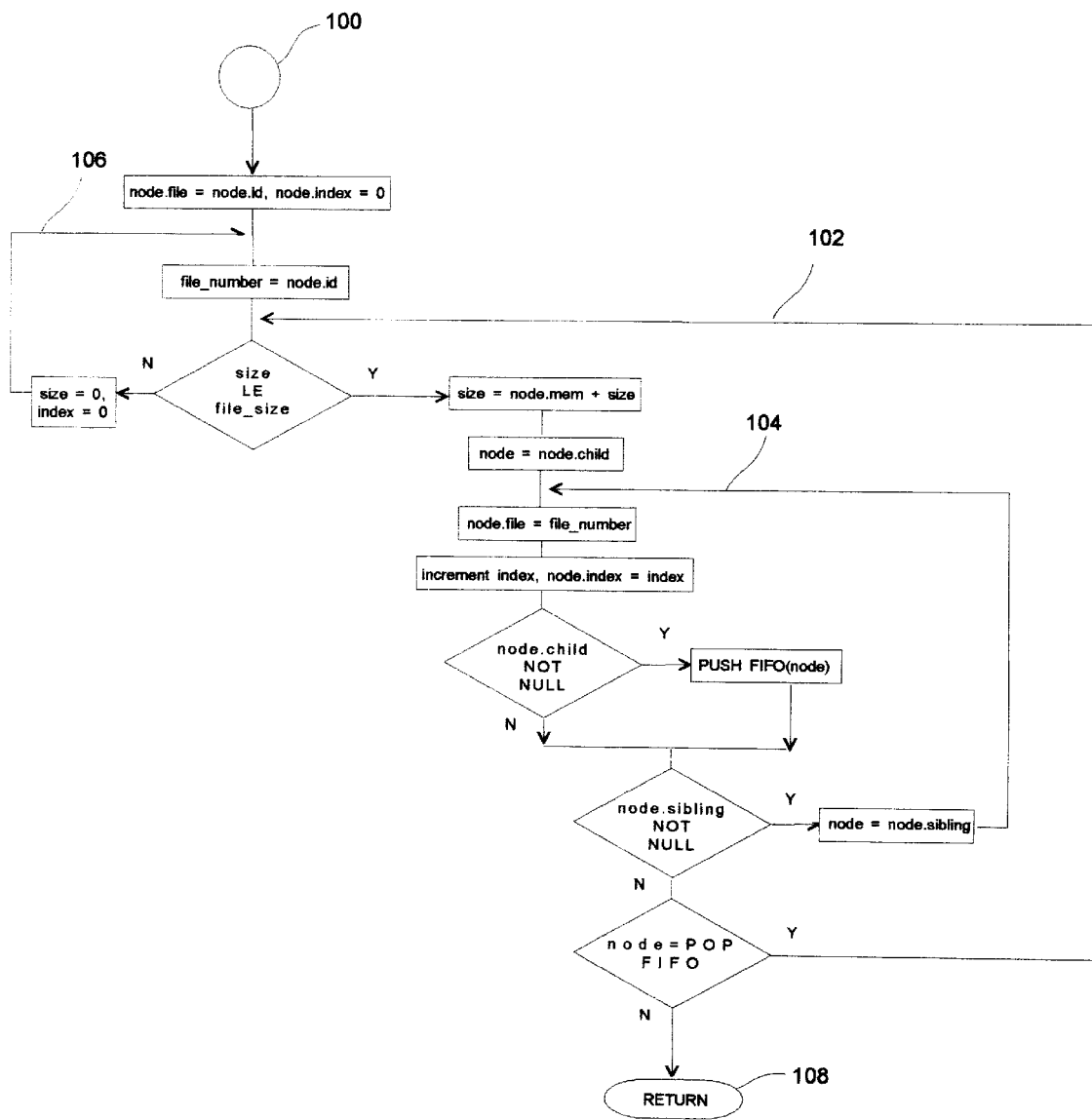

In order to generate compiled menu data files the present invention assigns a file and record index number for each node in structure 29. The flow chart of the program logic for AssignLocations routine 100 is depicted in FIG. 9c. Routine 100 uses a FIFO (first in, first out) queue to visit each node in the structure 29. Assignments are made based on the file_size value supplied by the menu developer in window 76 and mem 67 values. Inner loop 104 assigns file and index values for each node in a list, pushing parent nodes on the queue. Loop 102 pops nodes off the queue to travel down the structure and add mem 67 to size. When size is greater than the file_size, control flows to loop 106, size and index variables are set to zero, and a new file_number is assigned. When the FIFO queue returns a false value, indicating an empty queue, flow returns to the calling routine at 108.

Figure 9D:
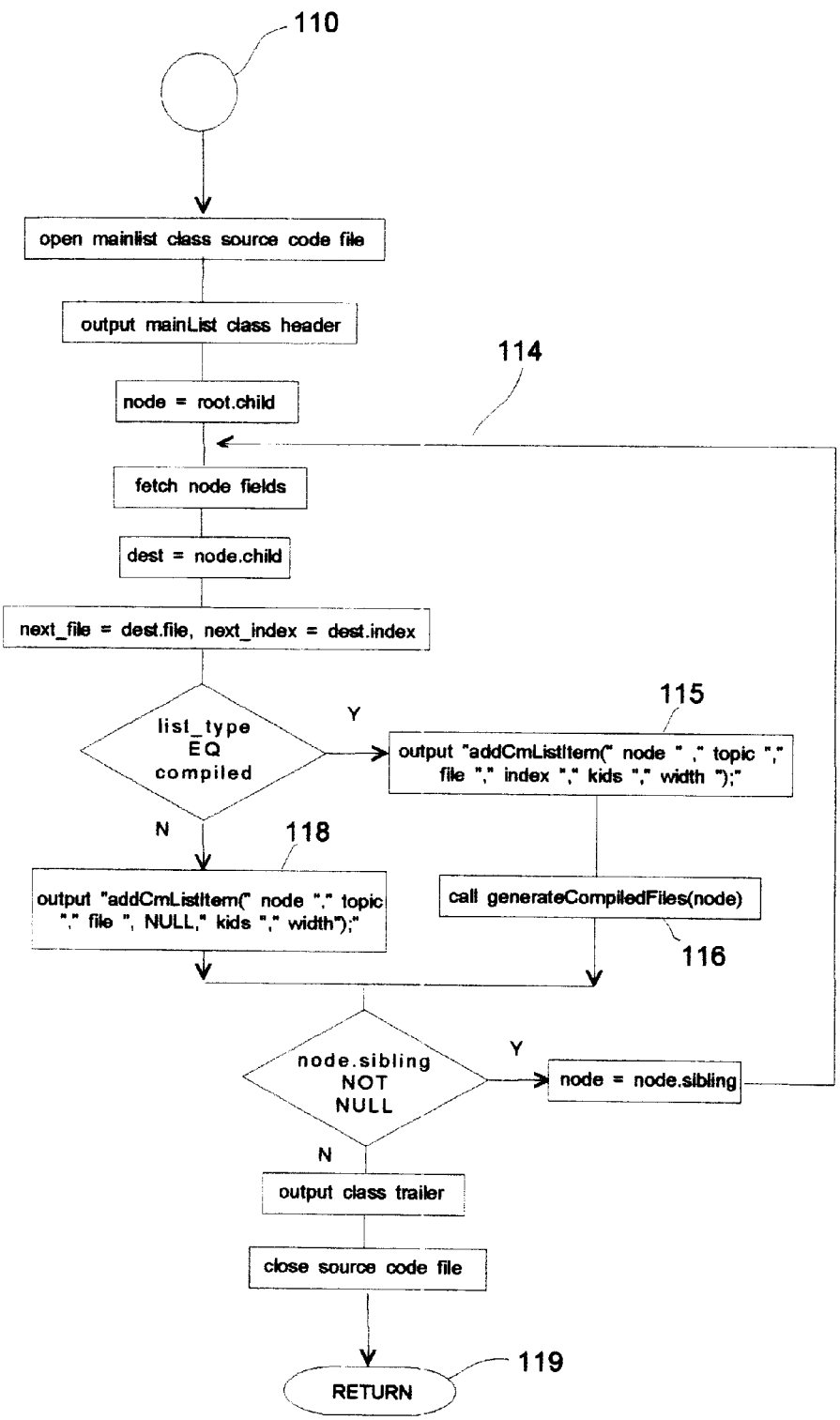

The GenerateAppletList routine 110 generates source code for the mainList class in applet 26 that represents the top list menu in a content menu for both compiled and runtime files. This source code insures the end-user on client computer 12 a quick and rapid response. The program logic for GenerateAppletList 110 is depicted in FIG. 9d. On entry, the list type argument signifies how list items are represented. First, routine 110 outputs the class header and program code for mainList at 112. This includes housekeeping functions such as setting the list menu title and local variables for positioning the pop-up menu on the screen. In loop 114, routine 110 visits each root node child to fetch field values node 61, topic 62, child 65, kids 69, and width 72 from structure 29. Next, it locates the child node to set the next_file 78 and next_index 79 variables.

The present invention defines an addCmListItem class that adds an item to a menu list and retains local variables for each item that corresponds to node 61, next_file 78, next_index 79, kids 69, and width 72. If the list type is compiled routine 110 generates source code that translates each field value as an argument to addCmListItem at 115. Otherwise, it generates source code that passes a NULL value corresponding to the next_index field 79 at 118. When all the root, child, and sibling nodes have been processed routine, 110 outputs source code that competes the mainList class, and then returns to the calling routine at 119.

Figure 9E:
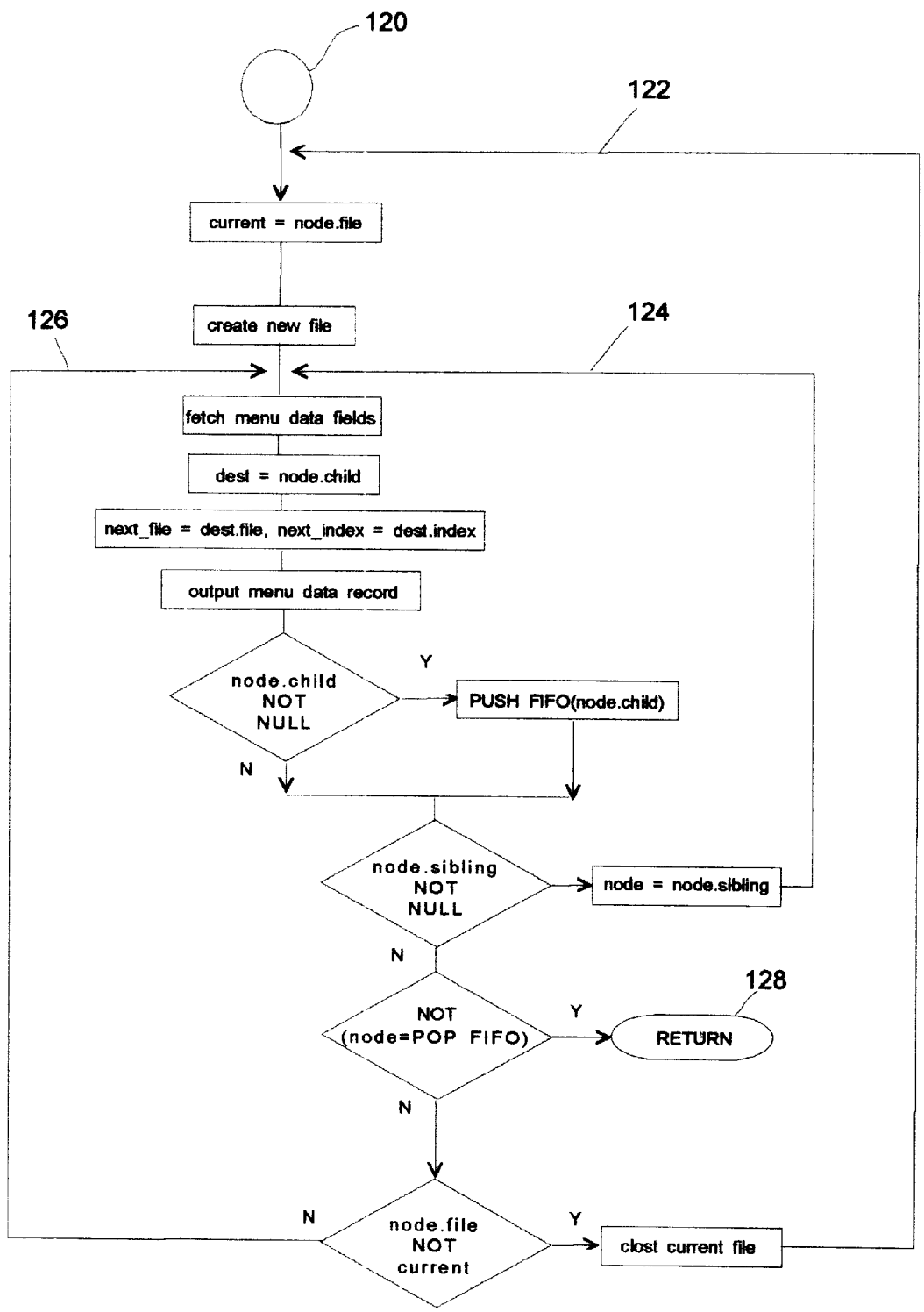

The generateCompiledFiles, routine 120, is depicted by the flow chart in FIG. 9e. On entry at 120, current is set to the node 61 value and a new file is created. Routine 120 uses a FIFO (first in, first out) queue to visit all the nodes and lists in the structure 29. Loop 124 visits each node in a sibling list in the structure. First, loop 124 fetches node 61, topic 62, child 65, kids 68, and width 72. Next, it retrieves the file and index values of the child node, to set next_file 78 and next_index 79 fields for the menu data record 77 corresponding to the current node. And then, it outputs menu data record 77 to the open file. Next, the routine pushes each parent node in the sibling list on the FIFO queue.

At the end of each sibling list, routine 120 pops the queue and returns to the calling routine at 128 if the queue is empty. Otherwise, the node's file is compared to the current variable. A difference causes the current file to be closed, a new current value assigned, and a new file opened via loop 122. Otherwise, loop 126 is taken and another set of list menu records are output to the current open file corresponding to the next sibling list in structure 29.

Figure 10:
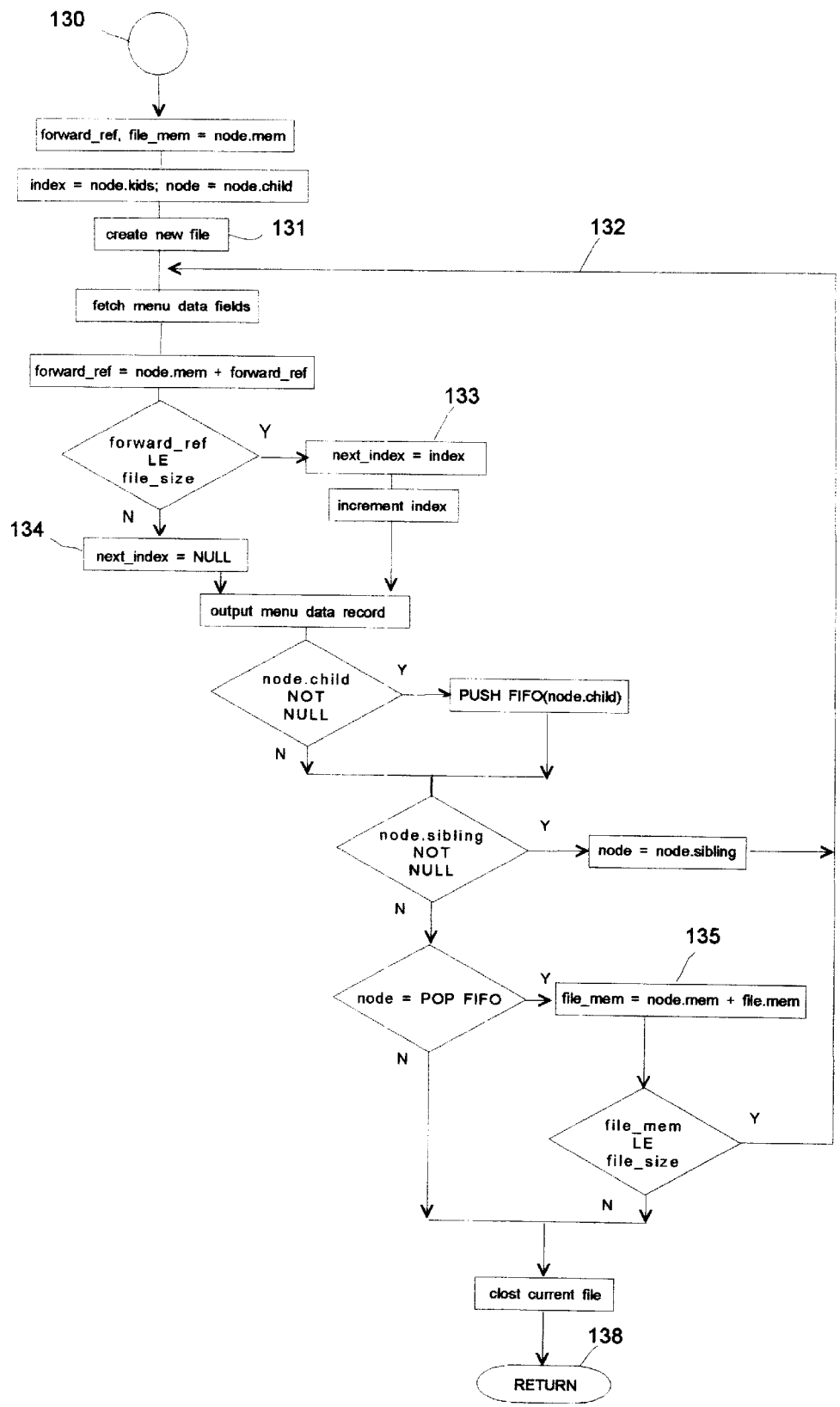
FIG. 10 depicts the flow chart of the script used to generate menu data at runtime.

FIG. 10 depicts the flow chart of the program logic of script file 28 on the server computer 15 used to generate a runtime menu data file. Routine 130 has one input argument, the node id associated with the list item selected by the end-user on client computer 12. Routine 130 uses the file_size variable supplied by the end-user in window 73, or an authoring system default value, to determine how many lists, representing one or more menu data records, to include in a runtime menu data file 27. It uses the file_mem variable to maintain a running total of the current file size to make this determination. It also uses the forward_ref variable to determine when next_file 78 and next_index 79 refer to a record 77 in the current menu data file or when these fields refer to a different runtime file.

Figure 11:
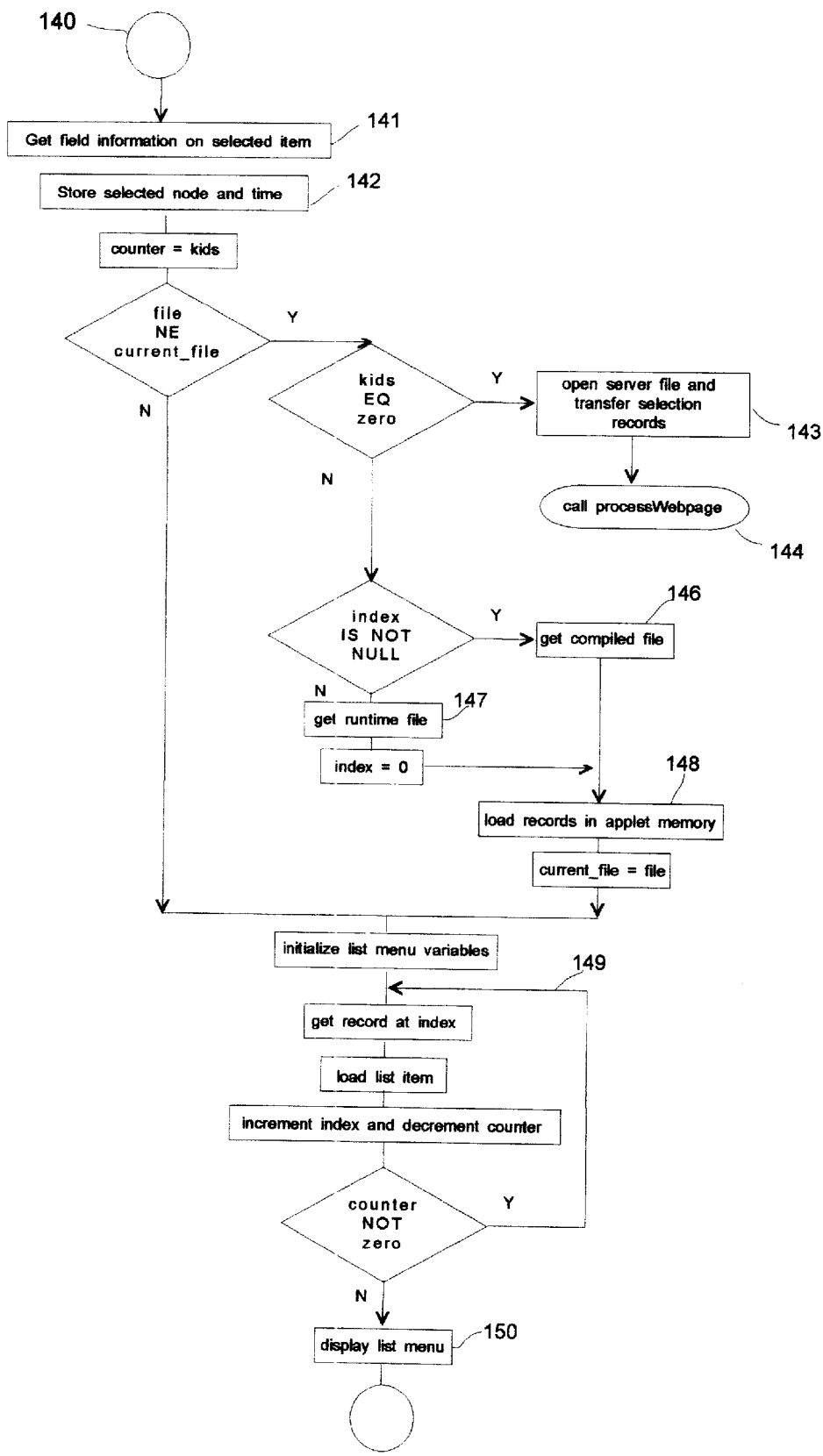
FIG. 11 depicts the flow chart of the applet in the present invention.

Finally, FIG. 11 depicts the flow chart of the event driven applet routine in byte code file 26 that opens a menu data file 27 on the server computer 15 and generates and displays a pop up list menu 21 on a client computer 12. As mentioned previously, the browser software 25 executes the byte code associated with the applet file 26 on the client computer 12. Menu data for the top level of the content menu is integrated into the byte code by the authoring system, see FIG. 9d for details. All other menu data is stored on the server computer 15.

Each time an end-user selects a list item in a content menu, program control flows to 140. At 142 the routine retrieves variables associated with the selected list item such as node 61, topic 62, next_file 78, next_index 79, kids 69, and width 72. At 142 routine 140 stores the selected node 61 and the current time in memory managed by the applet. If next_file 78 is different from the current_file, routine 140 needs to determine the nature of the next object.

If kids 69 is zero then the next object is a Web page. At 143, routine opens a server file dedicated to tracking end-user navigation and transfers one or more selected records. Next, routine calls processWebpage at 144.

Otherwise routine 140 checks next_index 79. A NULL next_index value signals a runtime file. If next_index is not NULL then the routine sends a request to open a compiled menu data file on the server at 146 corresponding to next_file 78. Otherwise, routine 140 calls script 28 on the server at 147 to generate a runtime file passing node 16 of the selected list item as its argument. When menu data file 27 is opened, routine 140 loads all menu data records 77 at 148 into memory managed by the applet 26 on the client computer 12, and resets the current_file variable.

When applet memory contains the appropriate menu data file records, loop 149 locates the first record in the next list and adds the topic to the new list using the addCmListItem class. Next, the index is incremented, the counter decremented, and the process continues until the counter is zero. Control drops from loop 149 and the routine displays the new pop-up list menu at 150 and returns control to the event manager.

Figure 12:
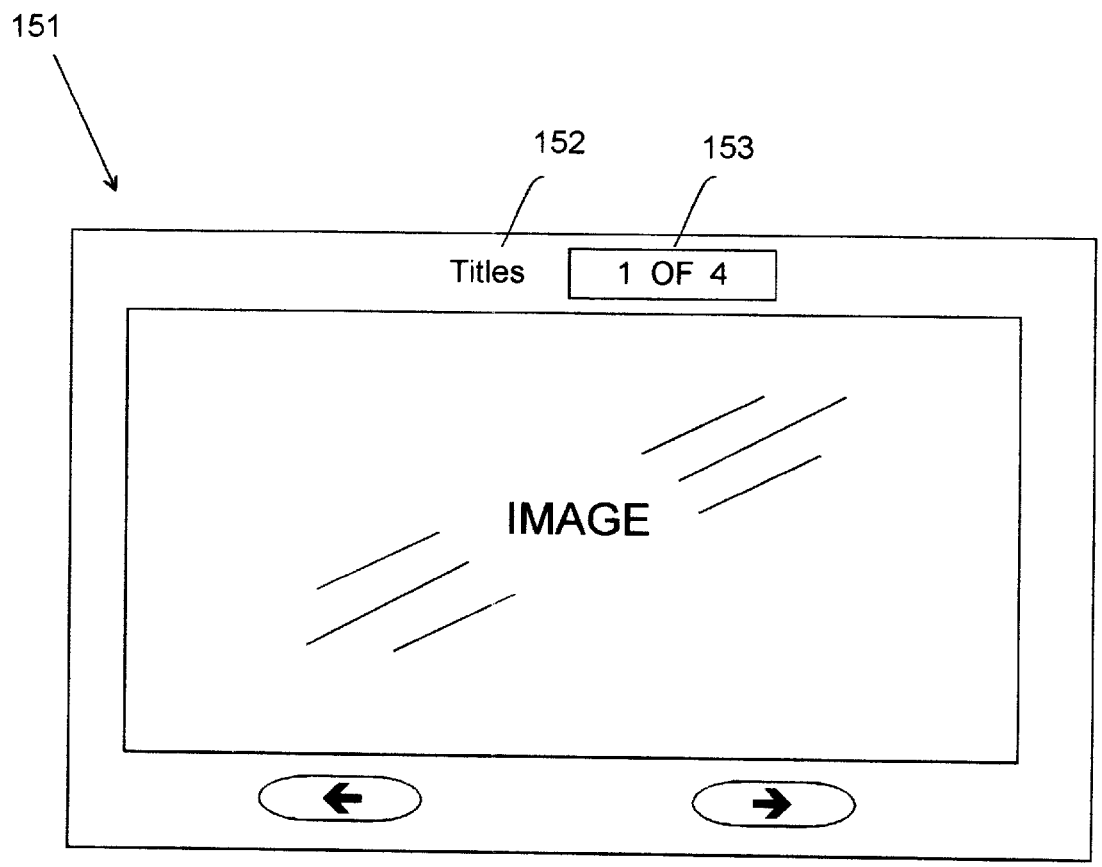
FIG. 12 depicts a graphic representation of an information object window generated by an applet.

And finally, FIG. 12 depicts a graphic representation of an object window generated by the applet in the presentation invention when a menu data record, that refers to a Web page, is a member of a sibling list. Window 151 includes a title field 152 and a list field 153 on the top of the frame, and a left and right button on the bottom of the frame to enable an enduser to scroll through a list of Web pages.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A menu authoring system means on a computer consisting of,
    building and maintaining a collection of menu data using an open hierarchical data structure to organize said collection of menu data into a plurality of lists and a plurality of paths to said plurality of lists;
    generating a menu data file that represents a subset of said collection of menu data in said open hierarchical data structure that provides menu data for at least one list menu in a content menu;
    generating a plurality of said menu data file where each said menu data file represents a subset of paths and lists in said open hierarchical data structure;
    controlling the size of said menu data file that represents said subset of said collection of menu data organized by said open hierarchical data structure with a file size setting;
    opening said menu data file, using an applet executing on said client computer, and fetching said subset of menu data in said menu data file and generating a list menu in said content menu on said client computer that corresponds to a subset in said open hierarchical data structure.

2. Said menu authoring system means of claim 1 are implemented in at least one computer language which runs on at least one operating system on said computer.

3. Said open hierarchical data structure of said menu authoring systems means of claim 1 is stored on memory accessed by said computer in a predefined file format recognized by at least one file storage and retrieval means on said computer.

4. Said applet on said client computer of said menu authoring system means of claim 1 is implemented in at least one applet-based language recognized by browser software.

5. Said menu authoring system means of claim 1 wherein further includes compiling a set of menu data files known as a general distribution release that includes all menu data in said collection of menu data organized by said open hierarchical data structure.

6. Said menu authoring system means of claim 1 wherein generating said menu data file further includes adding a code to menu data in said menu data file that identifies a list item selected by an end-user in said content menu on said client computer in said client-server network.

7. Said menu authoring system means of claim 1 further includes generating said menu data file on demand, at runtime using a software script means on a server computer in said client-server system.

8. said script software means of claim 7 on said server computer are implemented in at least one scripting language recognized by software on said client-server network.

9. Said script software means of claim 7 on said server computer further includes receiving said code from browser software on said client computer that identifies said list item in said content menu selected by an end-user on said client computer in said client-server network.

10. A menu authoring system means on a computer consisting of,
- an interactive software means to build and maintain a collection of menu data using an open hierarchical data structure to organize said collection of menu data into a plurality of lists and a plurality of paths to said plurality of lists;
- a software means to generate a menu data file that represents a subset of said collection of menu data in said open hierarchical data structure that provides menu data for at least one list menu in a content menu;
- a software means to generate a plurality of said menu data file where each said menu data file represents a subset of paths and lists in said open hierarchical data structure;
- a software means that enables a menu developer to control the size of said menu data file that represents said subset of said collection of menu data organized by said open hierarchical data structure using a file size setting;
- an applet software means on a client computer in a client-server network that opens said menu data file and fetches said subset of menu data in said menu data file in order to generate a list menu in said content menu on said client computer that corresponds to a subset in said open hierarchical data structure.

11. Said menu authoring system means of claim 10 are implemented in at least one computer language which runs on at least one operating system on said computer.

12. Said open hierarchical data structure of said menu authoring systems means of claim 10 is stored on memory accessed by said computer in a predefined file format recognized by at least one file storage and retrieval means on said computer.

13. Said applet software means on said client computer of said menu authoring system means of claim 10 are implemented in at least one applet-based language recognized by browser software.

14. Said menu authoring system means of claim 10 wherein further includes the means to compile a set of menu data files known as a general distribution release that includes all menu data in said collection of menu data organized by said open hierarchical data structure.

15. Said software means for generating said menu data file in said menu authoring system means of claim 10 further includes the means to include a code in said menu data file that identifies a list item selected by an end-user in said content menu on said client computer in said client-server network.

16. Said menu authoring system means of claim 10 wherein further includes a software script means on a server computer in said client-server system that enables said menu authoring system means to generate said menu data file on demand, at runtime.

17. Said script software means of claim 16 on said server computer are implemented in at least one scripting language recognized by software on said client-server network.

18. Said script software means of claim 16 on said server computer further includes a software means to receive said code from browser software on said client computer that identifies said list item in said content menu selected by an end-user on said client computer in said client-server network.

* * * * *